Patented May 15, 1928.

1,669,908

UNITED STATES PATENT OFFICE.

BERNARD LONG, OF PARIS, FRANCE, ASSIGNOR TO SOCIÉTÉ ANONYME DES MANUFACTURES DES GLACES & PRODUITS CHIMIQUES DE SAINT-GOBAIN, CHAUNY & CIREY, OF PARIS, FRANCE.

GLASS.

No Drawing.    Application filed January 12, 1926.  Serial No. 80,839.

Cheaper grades of glass such as used for sheet glass, vault-lights, etc., are generally made of what are known as lime soda glasses. It has been frequently observed that these glasses, although colorless when first made, become pink or yellow when subjected to sunlight. I have discovered that this change of tint in glasses of this type is due to the action of shorter wave lengths contained in the sunlight in causing new combinations of oxygen in the glass with metallic bases found therein, such as iron, manganese and selenium, and have discovered that this can be avoided by incorporating in the glass a small quantity of oxide of lead.

Consider a well known glass such as the following:—

| | Per cent. |
|---|---|
| $SiO_2$ | 72 |
| $Na_2O$ | 15.5 |
| $CaO$ | 12.5 |

This glass is liable to color changes under the conditions above stated.

Under my invention I would incorporate therein a small quantity, say two to three percent of oxide of lead. The substitution in question may be made by replacing a given percentage of the silica, alkali or base of the above glass with an equal percentage of the lead.

Applicant on October 13, 1927 filed an application making claims generic to the use of lead and titanium oxides and specific as to titanium oxide.

Having thus described my invention what I claim and desire to secure by Letters Patent is:—

A soda lime glass having metallic elements therein which is affected by waves of short lengths and containing not over 3% of oxide of lead.

In testimony whereof I hereunto affix my signature.

BERNARD LONG.